US011435481B2

(12) United States Patent
Knutson et al.

(10) Patent No.: US 11,435,481 B2
(45) Date of Patent: Sep. 6, 2022

(54) VEHICLE POSITION INFORMATION BASED ON MULTIPLE SOURCES

(71) Applicant: APTIV TECHNOLOGIES LIMITED, St. Michael (BB)

(72) Inventors: Eric Paul Knutson, Kokomo, IN (US); David Martin Spell, Kokoma, IN (US); Linh Pham, Kokomo, IN (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 92 days.

(21) Appl. No.: 17/070,286

(22) Filed: Oct. 14, 2020

(65) Prior Publication Data

US 2022/0113433 A1    Apr. 14, 2022

(51) Int. Cl.
*G01S 19/40* (2010.01)
*G01S 19/47* (2010.01)
*G01S 19/10* (2010.01)

(52) U.S. Cl.
CPC .............. *G01S 19/10* (2013.01); *G01S 19/47* (2013.01)

(58) Field of Classification Search
CPC .......... G01S 19/40; G01S 19/47; G01S 19/48; G01S 19/49; G01S 19/51
USPC ............. 342/357.23, 357.31, 357.32, 357.34
See application file for complete search history.

(56) References Cited

U.S. PATENT DOCUMENTS

| 10,895,463 | B1 * | 1/2021 | Cope | G01C 21/3484 |
| 2017/0305374 | A1 * | 10/2017 | Hong | B60R 21/13 |
| 2018/0045833 | A1 | 2/2018 | Wu et al. | |
| 2020/0200920 | A1 * | 6/2020 | Irish | G06Q 10/06311 |

FOREIGN PATENT DOCUMENTS

| CN | 101399723 A | * | 4/2009 |
| EP | 2966477 A1 | | 1/2016 |
| WO | 2013002861 A2 | | 1/2013 |

OTHER PUBLICATIONS

Extended European Search Report for Application No. EP 21 20 0548 dated May 27, 2022.

* cited by examiner

*Primary Examiner* — Harry K Liu
(74) *Attorney, Agent, or Firm* — Carlson, Gaskey & Olds, P.C.

(57) ABSTRACT

A device for determining position information includes a detector that is configured to detect a position of the device and a processor that is configured to determine the position information based on a primary position indication from the detector and a secondary position indication from a second detector that is distinct from the detector. The processor determines the position information by aligning the primary position indication with the secondary position indication based on identifying a pattern of the primary position indication that corresponds with a pattern of the secondary position indication.

20 Claims, 2 Drawing Sheets

VEHICLE POSITION INFORMATION BASED ON MULTIPLE SOURCES

BACKGROUND

Modern automotive vehicles include an increasing amount of electronic technology, such as sensors or detectors that provide driver assistance or autonomous vehicle control. Information regarding the movement or heading direction of the vehicle is useful or necessary for such assistance or control. There are various ways to obtain such information. For example GNSS satellite technology allows for determining and tracking vehicle location, movement or direction information based on detecting multiple satellites and using known algorithms. Inertial measurement units (IMUs) are also useful for tracking vehicle movement in certain circumstances.

There are limitations, however, with many GNSS or IMU devices. For example, the amount of noise is typically significant and known approaches to compensate for or reduce such noise tend to be expensive. Cost is often a primary concern for vehicle manufacturers or component suppliers, which makes expensive solutions undesirable.

SUMMARY

An illustrative example embodiment of a device for determining position information includes a detector that is configured to detect a position of the device, and a processor that is configured to determine the position information based on a primary position indication from the detector and a secondary position indication from a second detector that is distinct from the detector. The processor determines the position information by aligning the primary position indication with the secondary position indication based on identifying a pattern of the primary position indication that corresponds with a pattern of the secondary position indication.

In an embodiment having at least one feature of the device of the previous paragraph, the processor corrects a difference in timing of the position indication and the secondary position indication by the aligning.

In an embodiment having at least one feature of the device of any of the previous paragraphs, the processor is configured to determine the position information by using the secondary position indication to remove noise from the primary position indication.

In an embodiment having at least one feature of the device of any of the previous paragraphs, the processor is configured to determine the position information by averaging at least one characteristic of the primary position indication and at least one corresponding characteristic of the secondary position indication.

In an embodiment having at least one feature of the device of any of the previous paragraphs, the patterns of the position indications occur in the respective position indications over time.

In an embodiment having at least one feature of the device of any of the previous paragraphs, the patterns respectively comprise a waveform of an output of the respective detectors.

In an embodiment having at least one feature of the device of any of the previous paragraphs, the processor is configured to determine the position information based on the primary position indication, the secondary position indication and at least one additional position indication from at least one additional detector that is distinct from the detector by identifying a pattern in the additional position indication that corresponds to the identified patterns of the primary position indication and the secondary position indication.

In an embodiment having at least one feature of the device of any of the previous paragraphs, the processor is configured to determine the position information by averaging at least one characteristic of the position indications.

In an embodiment having at least one feature of the device of any of the previous paragraphs, the processor is configured to exclude one of the position indications from determining the position information based on the one of the position indications having at least one portion that is inconsistent with corresponding portions of others of the position indications that are consistent with each other.

In an embodiment having at least one feature of the device of any of the previous paragraphs, the processor is configured to provide an output based on the position information and the output indicates a location of the device.

In an embodiment having at least one feature of the device of any of the previous paragraphs, the processor is configured to provide an output based on the position information and the output indicates motion of the device.

In an embodiment having at least one feature of the device of any of the previous paragraphs, the detector comprises a GNSS receiver or an inertial measurement unit.

In an embodiment having at least one feature of the device of any of the previous paragraphs, the processor is configured to determine a location of the secondary detector relative to the detector and to use the determined location of the secondary detector when determining the position information.

In an embodiment having at least one feature of the device of any of the previous paragraphs, the secondary detector is moveable relative to the detector and the processor is configured to update the determined location of the secondary detector based on the secondary position indication.

In an embodiment having at least one feature of the device of any of the previous paragraphs, the processor is configured to monitor the secondary position indication, determine if a movement pattern of the secondary position indication corresponds to repeated movement of the secondary detector relative to the detector, and exclude the secondary position indication from determining the position information if repeated movement of the secondary detector exceeds a threshold.

An illustrative example embodiment of a system comprising includes the device of any of the previous paragraphs and a secondary detector.

An illustrative example embodiment of a vehicle includes the device of any of the previous paragraphs, the primary detector is in a fixed position on the vehicle and the secondary detector is moveable relative to the vehicle.

In an embodiment having at least one feature of the vehicle of the previous paragraph, the position information corresponds to vehicle position information.

An illustrative example embodiment of a method of determining position information includes detecting a position using a detector that provides a primary position indication, obtaining a secondary position indication from a second detector that is distinct from the detector, identifying a pattern of the primary position indication that corresponds with a pattern of the secondary position indication, and determining the position information by aligning the primary position indication with the secondary position indication based on the identified patterns.

An embodiment having at least one feature of the method of the previous paragraph includes correcting a difference in timing of the position indication and the secondary position indication by the aligning.

In an embodiment having at least one feature of the method of any of the previous paragraphs, determining the position information includes using the secondary position indication to remove noise from the primary position indication.

In an embodiment having at least one feature of the method of any of the previous paragraphs, determining the position information includes combining at least one characteristic of the primary position indication and at least one corresponding characteristic of the secondary position indication.

In an embodiment having at least one feature of the method of any of the previous paragraphs, determining the position information is based on the primary position indication, the secondary position indication and at least one additional position indication from at least one additional detector that is distinct from the detector and determining the position information includes identifying a pattern in the additional position indication that corresponds to the identified patterns of the primary position indication and the secondary position indication.

In an embodiment having at least one feature of the method of any of the previous paragraphs, determining the position information includes excluding one of the position indications from determining the position information based on the one of the position indications having at least one portion that is inconsistent with corresponding portions of others of the position indications that are consistent with each other.

An embodiment having at least one feature of the method of any of the previous paragraphs includes determining a location of the secondary detector relative to the detector and using the determined location of the secondary detector when determining the position information.

In an embodiment having at least one feature of the method of any of the previous paragraphs, the secondary detector is moveable relative to the detector and the method comprises monitoring the secondary position indication, determining if a movement pattern of the secondary position indication corresponds to repeated movement of the secondary detector relative to the detector, and excluding the secondary position indication from determining the position information if repeated movement of the secondary detector exceeds a threshold.

The various features and advantages of at least one disclosed example embodiment will become apparent to those skilled in the art from the following detailed description. The drawings that accompany the detailed description can be briefly described as follows.

DETAILED DESCRIPTION

Figure 1:
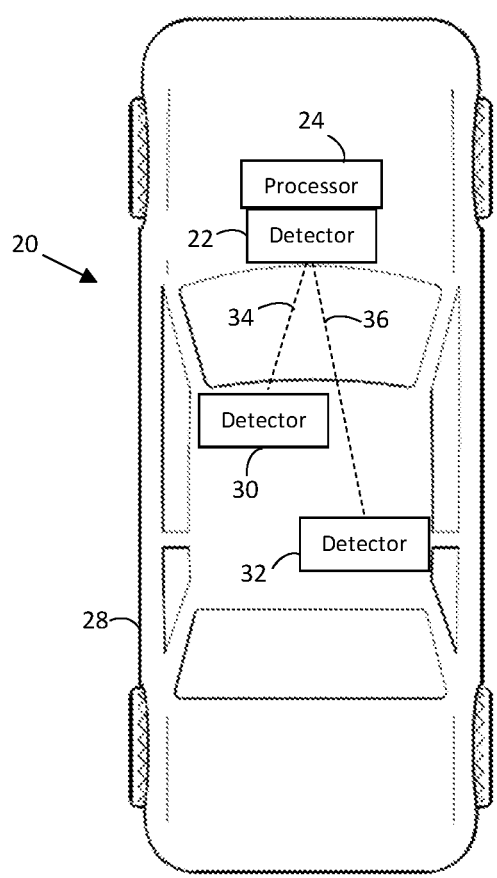
FIG. 1 schematically illustrates an example system for determining position information based on the output of multiple detectors.

FIG. 1 schematically illustrates a device 20 for determining position information. The device 20 includes a detector 22 that provides a primary position indication to a processor 24 that is configured to determine position information regarding the position of the device 20 based on at least the primary position indication. The device 20 in the illustrated embodiment is associated with a vehicle 28. The device 20 is secured in a predetermined and fixed position on the vehicle, for example, and the device 20 provides position information regarding the position of the vehicle 28.

The term position information is used in a generic sense in this description. For example, position information may be or include location information, such as geological coordinates, at a particular instant in time. Additionally, position information may be or include motion or direction information, such as a change in location over time. In the illustrated example embodiment shown in FIG. 1, the position information indicates a position, such as location or motion, of the vehicle 28.

The detector 22 in this example embodiment is configured to detect GNSS satellite signals (not illustrated) and to generate an output that is a primary position indication used by the processor 24 to determine the position information regarding the position of the vehicle 28. There are known algorithms to determine position information based on GNSS satellite signals and the processor 24 in some embodiments uses a known technique to determine the vehicle position.

The detector 22 in this example embodiment also includes an inertial measurement unit (IMU) that provides an indication of motion of the detector 22, which corresponds to motion of the vehicle 28. The processor 24 is configured to use indications from the IMU of the detector 22 to determine the position information under appropriate circumstances. The primary position indication from the detector 22 may be based on IMU output, GNSS satellite detections, or both.

The processor 24 is configured to use position indications from multiple detectors to determine the position information. Using position indications from multiple detectors allows for reducing or removing the effect of noise within the primary position indication from the detector 22. In the example of FIG. 1, a second detector 30 is on or in the vehicle 28. The second detector 30 in this example is configured to detect GNSS satellite signals and to provide a corresponding position indication. The processor 24 receives and uses the position indication from the second detector 30 as a secondary position indication.

An additional or third detector 32 is situated in or on the vehicle 28 in the illustrated example. The third detector 32 also provides a position indication based on detecting GNSS satellite signals. The processor 24 receives and uses the additional position indication from the third detector when determining the position information regarding the position of the vehicle 28.

In some embodiments, one or all of the additional detectors include an IMU that provides an indication that the processor 24 may use for at least one purpose, such as determining the position information.

The detector 22 in the illustrated example remains in a predetermined and fixed position relative to the vehicle 28 or a vehicle coordinate system. The position indication of the detector 22 is considered primary because the detector 22 is a permanent part of the device 20, while the other detectors 30, 32 in the illustrated example may not always be present (or reliable). In one sense, the detector 22 and the processor 24 are considered a position determining hub of an ad hoc system or network including the other detectors 30, 32.

The detectors 30 and 32 may be associated with components of the vehicle 28 or may be part of portable devices that a driver or passenger may bring into the vehicle 28. In the case of a vehicle component, the corresponding detector 30 or 32 may remain in a fixed location relative to the detector 22 or a vehicle coordinate system. The processor 24 uses that relative location when determining the vehicle position information based, at least in part, on the position indication from the corresponding detector 30, 32. In the case of a portable device, the processor 24 is configured to determine the current location of the detector 30, 32 relative to the detector 22 or relative to the vehicle coordinate system when using the position indication from the detector 30, 32 as part of the vehicle position information determination.

The relative locations of the detectors 30, 32 are schematically represented at 34 and 36, respectively, in FIG. 1. Since each of the detectors 22, 30 and 32 can provide different position indications for a single location of the vehicle 28 based on their different locations in or on the vehicle (or vehicle coordinate system), the processor 24 is configured to account for the relative locations 34, 36 of the detectors 30, 32 when using the respective position indications.

Figure 2:
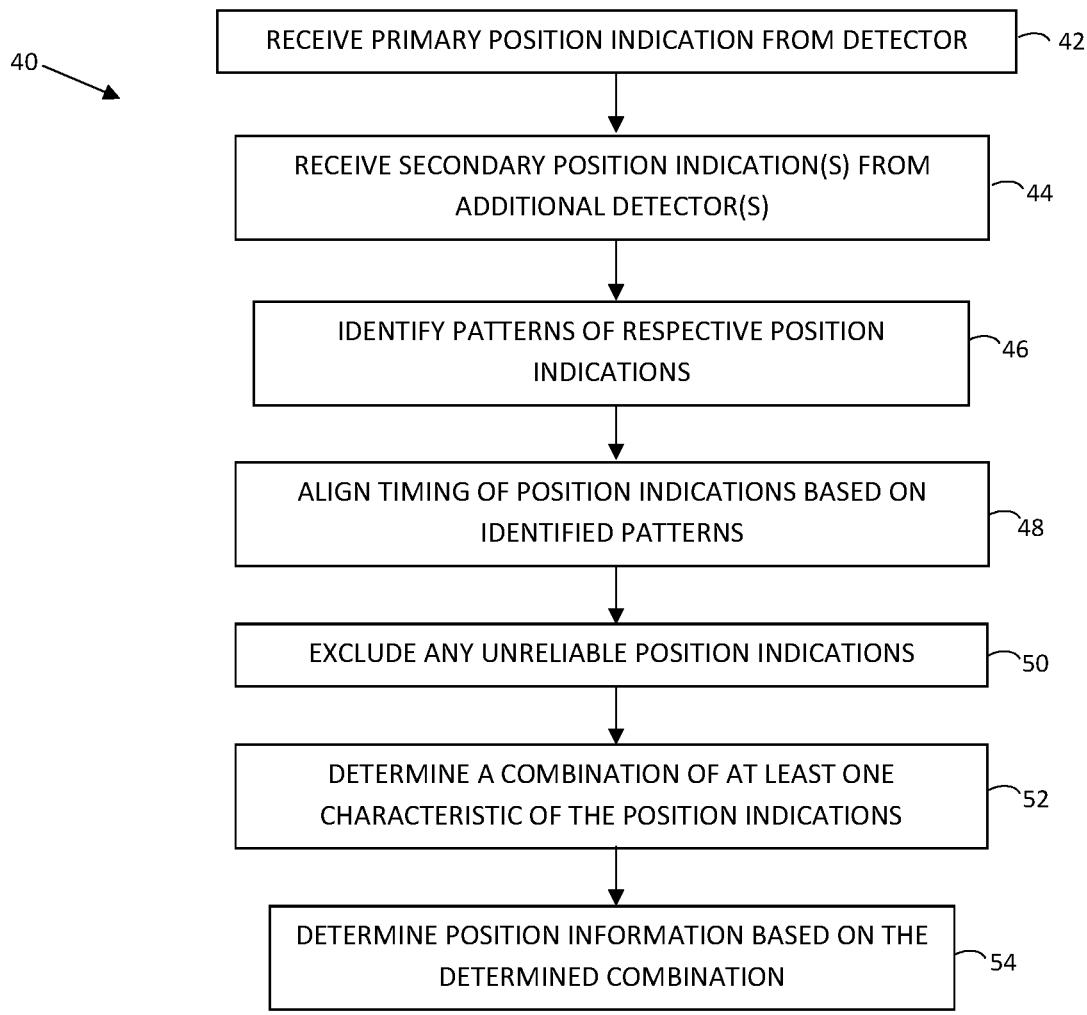
FIG. 2 is a flow chart diagram summarizing an example method of determining position information.

FIG. 2 is a flowchart diagram 40 that summarizes an example approach to determine position information based on position indications from the detectors 22, 30 and 32. At 42, the processor 24 receives the primary position indication from the detector 22. At 44, the processor receives additional or secondary position indications from the detectors 30 and 32, respectively.

The position indications from the detectors 22, 30 and 32 include latency. The illustrated example embodiment includes aligning the timing of the position indications as a prerequisite to determining the position information based on multiple detector indications. In FIG. 2, the processor 24 identifies patterns of the respective position indications at 46. Each detector's position indication will have a pattern that depends on the position of the vehicle 28. For example, as the vehicle 28 moves, the IMU output from each detector 22, 30, 32 will include a waveform pattern, such as a series of peaks and valleys, that is based on the vehicle movement. The waveform patterns of the different detectors will correspond in some regard since all detectors are moving with the vehicle 28. The processor 24 is configured to identify or recognize the pattern(s) of each detector's position indication.

At 48, the processor 24 aligns the position indications based on the identified patterns. Aligning the position indications based on the identified, respective patterns aligns the timing of the position indications and accommodates or accounts for any differences in the latency of each indication. For example, if the position indication from the detector 30 has less latency than the indication from the detector 22, the IMU output from the detector 30 will have a pattern that corresponds to the pattern of the IMU output of the detector 22 but precedes it in time. Similarly if the indication from the detector 32 has the largest latency, the IMU output pattern from that detector will be delayed compared to the pattern of the detector 22.

The processor 24 aligns the IMU output patterns so the respective detector position indications regarding a particular instance or segment of time are synchronized. In the example currently under consideration, the processor 24 effectively shifts the indication from the detector 30 in one direction (to compensate for the higher latency of the detector 22) and the indication from the detector 32 in an opposite direction (to compensate for the even higher latency of the detector 32) so that all three indications provide position information regarding the same instant of time. In other words, the position indications each include a pattern that is based on the vehicle position at a particular time and the processor 24 aligns the position indications so that the latency of any of the detector outputs does not adversely affect an aggregated position determination based on all of the detector position indications.

One feature of aligning the detector indications in this manner is that any IMU dead reckoning performed by the processor 24 has better accuracy and reliability compared to using the output of a single IMU for dead reckoning.

In the example embodiment, the processor 24 also performs the aligning at 48 using the respective GNSS-based indications from the detectors. In some embodiments, the processor 24 treats the IMU and GNSS indications separately and performs two distinct alignments while in other embodiments, the processor 24 aligns the detector indications based on the IMU and GNSS patterns. Some embodiments of the processor 24 perform the aligning at 48 based on respective detector GNSS patterns without taking IMU-based data into account.

In some circumstances the position indication of a detector may not be reliable or useful. At 50, the processor 24 determines whether any of the detector indications is unreliable and excludes any such position indication from the process of determining the position information. An unreliable detector indication will have at least one characteristic that is inconsistent with a corresponding characteristic of the primary position indication and such inconsistencies may introduce additional error into the determined position information rather than being useful for reducing or removing error.

For example, the detector 32 may be situated in the vehicle such that the roof of the vehicle blocks a direct line of sight between the detector 32 and satellites that are detected by the detectors 22 and 30. The GNSS-based information from the detector 32 may be the result of a multipath reflection of a satellite signal, which increases the distance traveled by the signal and a corresponding error in the pseudo range of the position indication from the detector 32.

The processor 24 in some embodiments determines which of the pseudo ranges is the shortest and uses that pseudo range as a baseline. The processor 24 compares a difference between that shortest pseudo range and the pseudo range of each additional detector to a threshold. If the difference exceeds the threshold, the pseudo range is considered flawed or inconsistent and the position indication from the corresponding detector is excluded from the determination of the position information for at least a preselected period of time or until the difference of a subsequently reported pseudo range from the corresponding detector is below the threshold.

The processor 24 in an example embodiment is configured to use the technique taught in the U.S. patent application Ser. No. 16/788,567 filed on 12 Feb. 2020, now U.S. Pat. No. 11,022,698, issued on Jun. 1, 2021, to determine when a pseudo range is based on a reflected or multipath signal. The entirety of that document is incorporated by reference.

Another example scenario in which a detector may not be reliable is when the detector 30 or 32 is subject to movement relative to the detector 22. For example, an IMU of the detector 30 may indicate that the device of which the detector 30 is a part is being manipulated or moved within the vehicle in a manner that makes the position indication from that detector unreliable. This may occur when an individual is moving the device, such as a smartphone, or when the device is on a relatively low friction surface and slides in response to acceleration of the vehicle 28. Such movement may introduce errors because the relative location 34 of the detector 30 changes in a manner that can introduce unwanted error.

The manner in which the processor 24 determines whether to exclude the position indication from a detector may vary to meet the needs of a particular implementation of the teachings of this description. Those skilled in the art who have the benefit of this description will be able to determine how to program or otherwise configure a processor to make an exclusion decision to meet their particular needs.

At 52, the processor 24 determines a combination of at least one characteristic of the position indications from the detectors 22, 30 and 32. For example, the location in geo-coordinates of the vehicle 28 based on the individual detector outputs may differ slightly. The processor 24 determines an average of those locations as the determined combination and uses that as the geo-coordinates of the vehicle position information. The processor 24 takes the relative positions of the detectors 30, 32 into account when determining the respective geo-coordinate indications.

Another example characteristic that the processor 24 may determine a combination of is an indication of a trajectory angle or a speed of the vehicle 28. The combination may be an average, a weighted average or an output of a Kalman filter, for example.

Regardless of what characteristic(s) is (are) used in combination by the processor 24, the combination(s) used by the processor 24 results in refined or corrected position information compared to simply relying only on the detector 22. The noise in the primary position indication output of the detector 22 may be reduced or removed based on the position indications from the other detectors 30, 32 once those indications have been aligned with the primary position indication.

In some embodiments, when the position indications from the detectors 22, 30 and 32 differ, the processor 24 translates at least one of the position indications so that they all indicate the same position before the selected characteristic is combined at 52.

At 54, the processor provides the position information as an output of the device. The position information may be used in a variety of ways, such as locating the vehicle 28, providing driver assistance to control movement of the vehicle 28, or for autonomous control of the vehicle 28.

Some embodiments include refining the position information based on position indications from secondary or additional detectors without determining a combination, such as an average, of a characteristic of the respective position indications. For example, when the position indications over time indicate consistency among the detectors and the detector 22 reports a pseudo range this is an anomaly compared to the pseudo ranges of the other detectors, the processor 24 may ignore the anomalous pseudo range or otherwise remove it from the position information output of the device 20.

A device that provides position information consistent with the above description provides refined or improved position information based on an ad hoc network or system including multiple detectors that are not necessarily normally associated in any way. The example embodiment includes taking advantage of the available IMU or GNSS data from multiple detectors to reduce or remove noise and errors from a detector output used to determine position information. Additionally, the disclosed device 20 and the example techniques described above improve position information without increasing cost by relying on more expensive or additional installed components.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A device for determining position information, the device comprising:
 a detector that is configured to detect a position of the device; and
 a processor that is configured to determine the position information based on a primary position indication from the detector and a secondary position indication from a second detector that is distinct from the detector, the processor determining the position information by aligning the primary position indication with the secondary position indication with respect to time based on identifying a pattern of the primary position indication that corresponds with a pattern of the secondary position indication, wherein a time when the pattern of the primary position indication begins is different than a time that the pattern of the secondary position indication begins.

2. The device of claim 1, wherein the processor corrects a difference in timing of the position indication and the secondary position indication by the aligning to account for a difference in a latency of the primary position indication and a latency of the secondary position indication.

3. The device of claim 1, wherein the processor is configured to determine the position information by using the secondary position indication to remove noise from the primary position indication.

4. The device of claim 1, wherein the processor is configured to determine the position information by combining at least one characteristic of the primary position indication and at least one corresponding characteristic of the secondary position indication.

5. The device of claim 1, wherein the patterns of the position indications occur in the respective position indications over time and the patterns respectively comprise a waveform of an output of the respective detectors.

6. The device of claim 1, wherein the processor is configured to determine the position information based on the primary position indication, the secondary position indication and at least one additional position indication from at least one additional detector that is distinct from the detector by identifying a pattern in the additional position indication that corresponds to the identified patterns of the primary position indication and the secondary position indication.

7. The device of claim 6, wherein the processor is configured to exclude one of the position indications from determining the position information based on the one of the position indications having at least one portion that is inconsistent with corresponding portions of others of the position indications that are consistent with each other.

8. The device of claim 1, wherein
 the processor is configured to provide an output based on the position information, and
 the output indicates at least one of a location or motion of the device.

9. The device of claim 1, wherein the processor is configured to determine a location of the second detector relative to the detector and to use the determined location of the second detector when determining the position information.

10. The device of claim 9, wherein
the second detector is moveable relative to the detector, and
the processor is configured to update the determined location of the second detector based on the secondary position indication.

11. The device of claim 9, wherein the processor is configured to
monitor the secondary position indication,
determine if a movement pattern of the secondary position indication corresponds to repeated movement of the second detector relative to the detector, and
exclude the secondary position indication from determining the position information if repeated movement of the second detector exceeds a threshold.

12. A method of determining position information, the method comprising:
detecting a position using a detector that provides a primary position indication;
obtaining a secondary position indication from a second detector that is distinct from the detector;
identifying a pattern of the primary position indication that corresponds with a pattern of the secondary position indication; and
determining the position information by aligning the primary position indication with the secondary position indication with respect to time based on the identified patterns,
wherein a time when the pattern of the primary position indication begins is different than a time that the pattern of the secondary position indication begins.

13. The method of claim 12, comprising correcting a difference in timing of the primary position indication and the secondary position indication by the aligning to account for a difference in a latency of the primary position indication and a latency of the secondary position indication.

14. The method of claim 12, wherein determining the position information includes using the secondary position indication to remove noise from the primary position indication.

15. The method of claim 12, wherein determining the position information includes combining at least one characteristic of the primary position indication and at least one corresponding characteristic of the secondary position indication.

16. The method of claim 12, wherein determining the position information is based on the primary position indication, the secondary position indication and at least one additional position indication from at least one additional detector that is distinct from the detector and determining the position information includes identifying a pattern in the additional position indication that corresponds to the identified patterns of the primary position indication and the secondary position indication.

17. The method of claim 16, wherein determining the position information includes excluding one of the position indications from determining the position information based on the one of the position indications having at least one portion that is inconsistent with corresponding portions of others of the position indications that are consistent with each other.

18. The method of claim 12, comprising determining a location of the second detector relative to the detector and using the determined location of the second detector when determining the position information.

19. The method of claim 18, wherein the second detector is moveable relative to the detector and the method comprises
monitoring the secondary position indication,
determining if a movement pattern of the secondary position indication corresponds to repeated movement of the second detector relative to the detector, and
excluding the secondary position indication from determining the position information if repeated movement of the second detector exceeds a threshold.

20. A method of determining position information, the method comprising:
detecting a position using a detector that provides a primary position indication;
obtaining a secondary position indication from a second detector that is distinct from the detector and is moveable relative to the detector;
identifying a pattern of the primary position indication that corresponds with a pattern of the secondary position indication; and
determining whether aligning the pattern of the primary position indication with the pattern of the secondary position indication is reliable for determining the position information by:
determining a location of the second detector relative to the detector,
monitoring the secondary position indication,
determining if a movement pattern of the secondary position indication corresponds to repeated movement of the second detector relative to the detector, and
excluding the secondary position indication from determining the position information if repeated movement of the second detector exceeds a threshold or
using the secondary position indication when determining the position information if movement of the second detector is below the threshold.

* * * * *